May 22, 1934.  W. F. ARTRIP  1,959,561
POTATO PLANTER
Filed Feb. 14, 1933   4 Sheets-Sheet 1
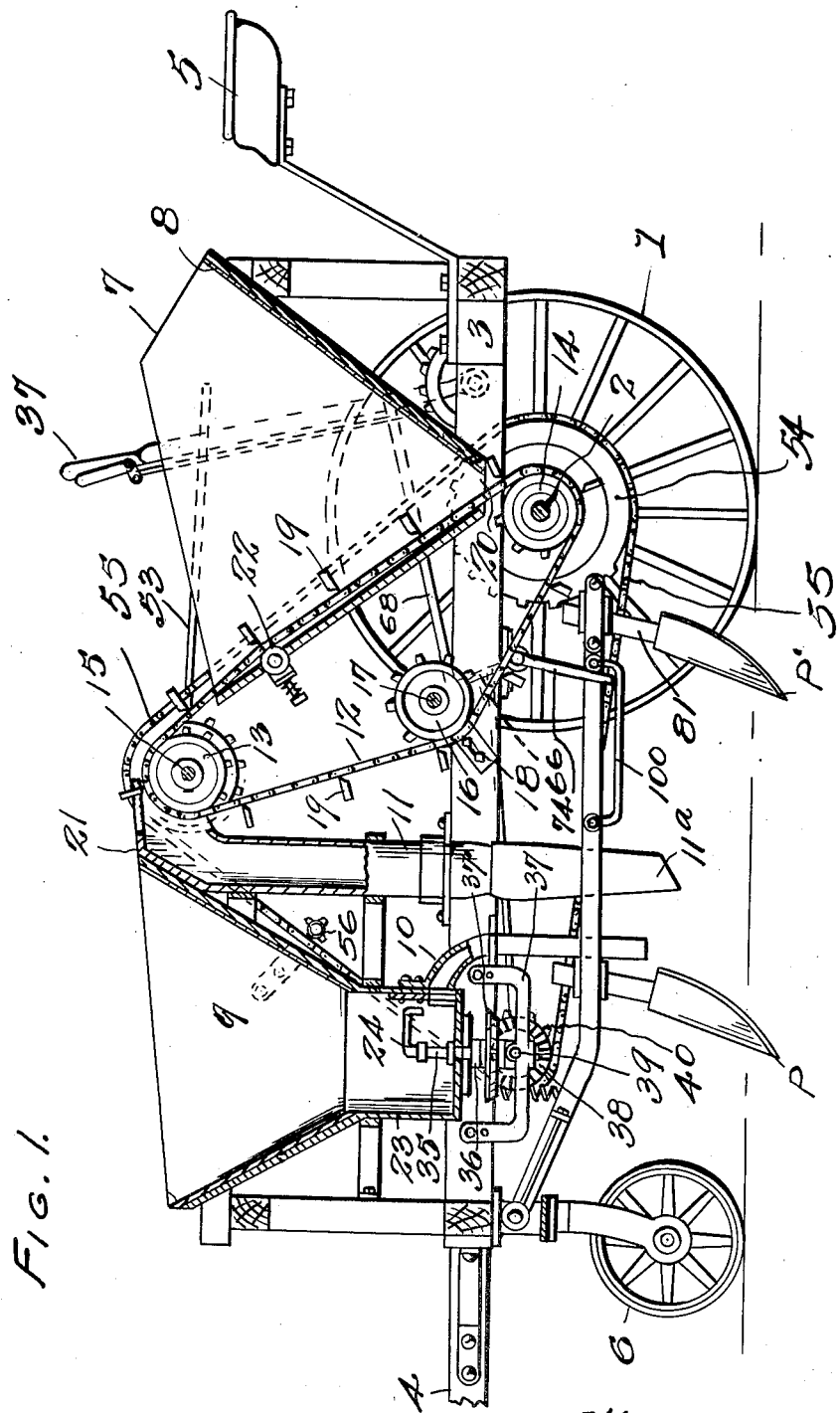
Inventor
WILLIAM F. ARTRIP
By Chas. K. Davies
Attorney

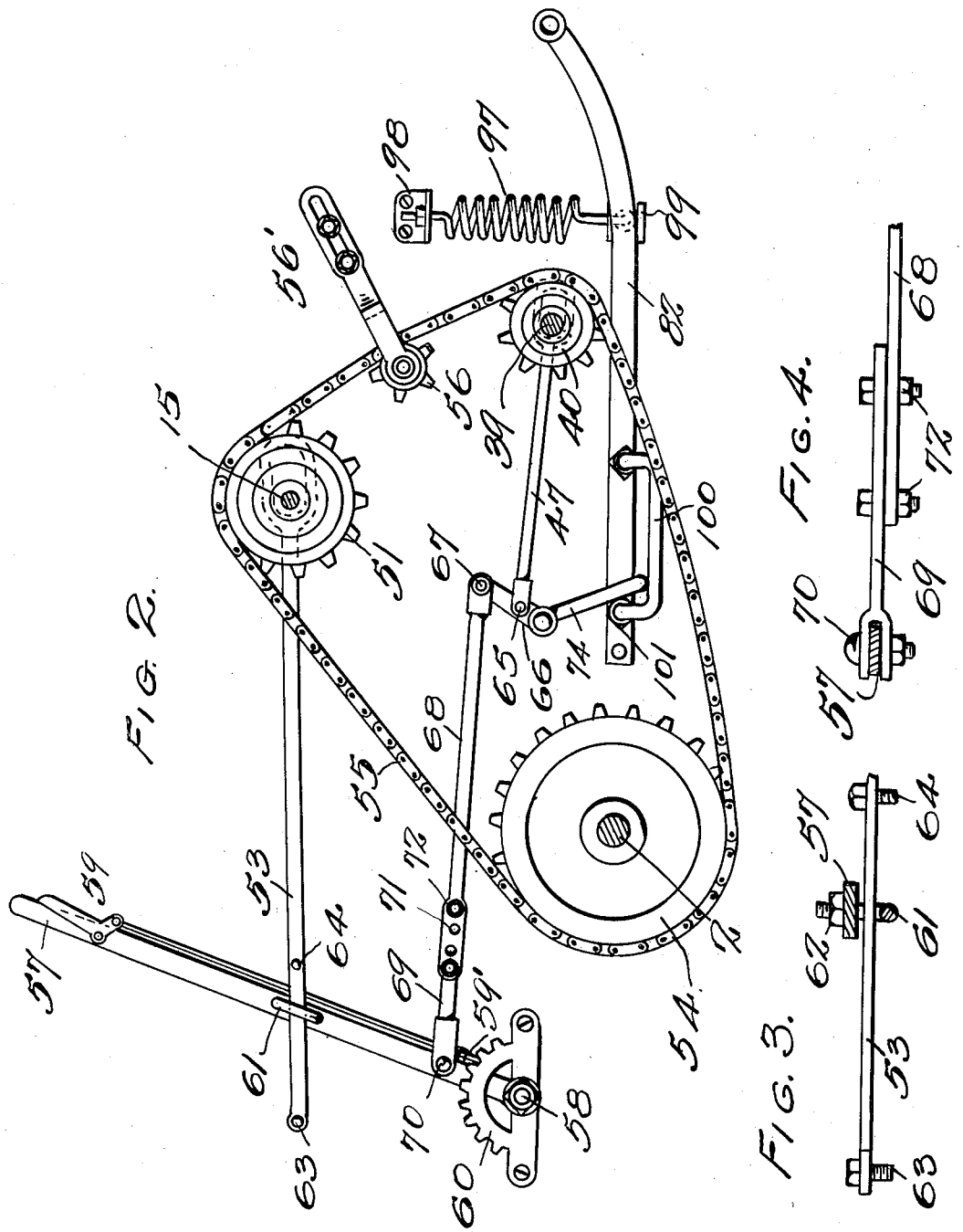

May 22, 1934.　　　W. F. ARTRIP　　　1,959,561
POTATO PLANTER
Filed Feb. 14, 1933　　　4 Sheets-Sheet 3
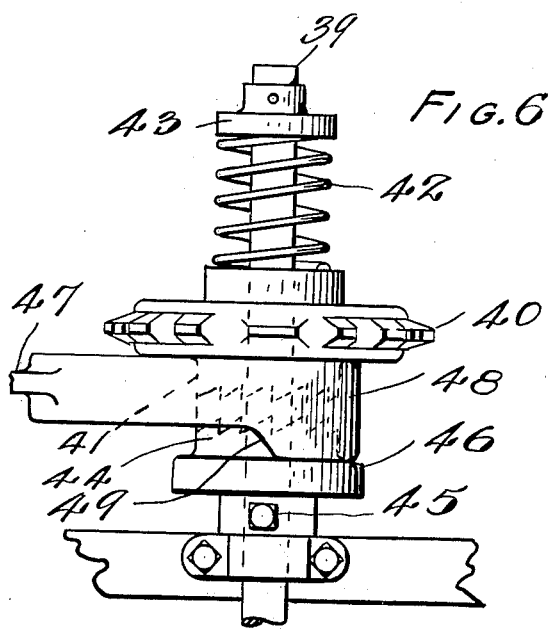
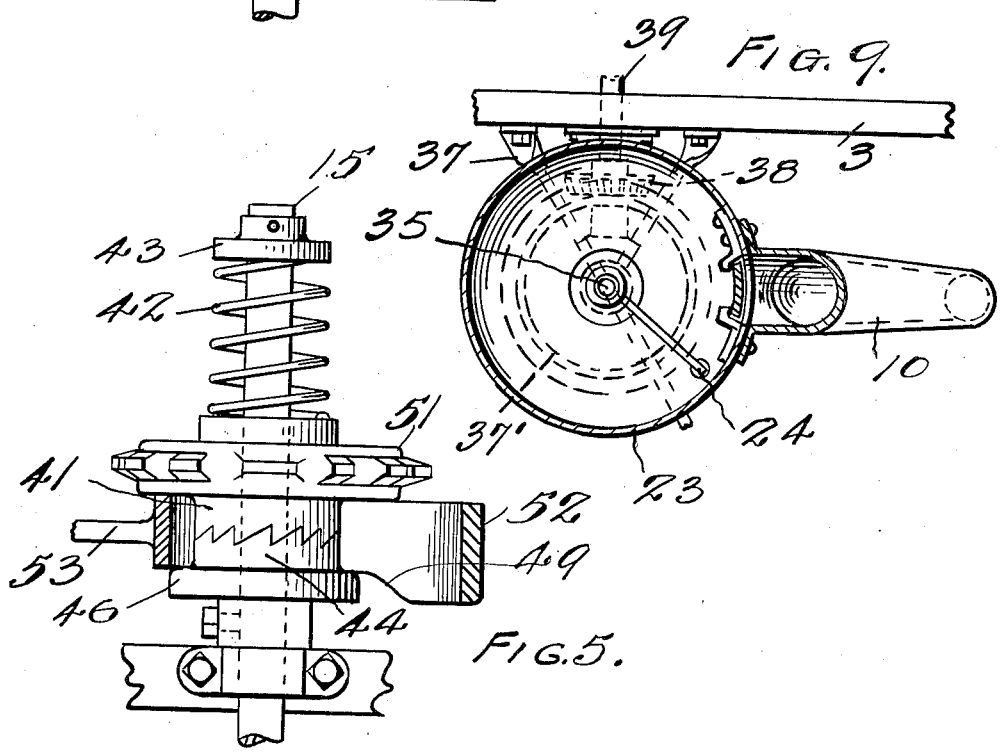
Inventor
WILLIAM F. ARTRIP
By Chas K. Davis
Attorney

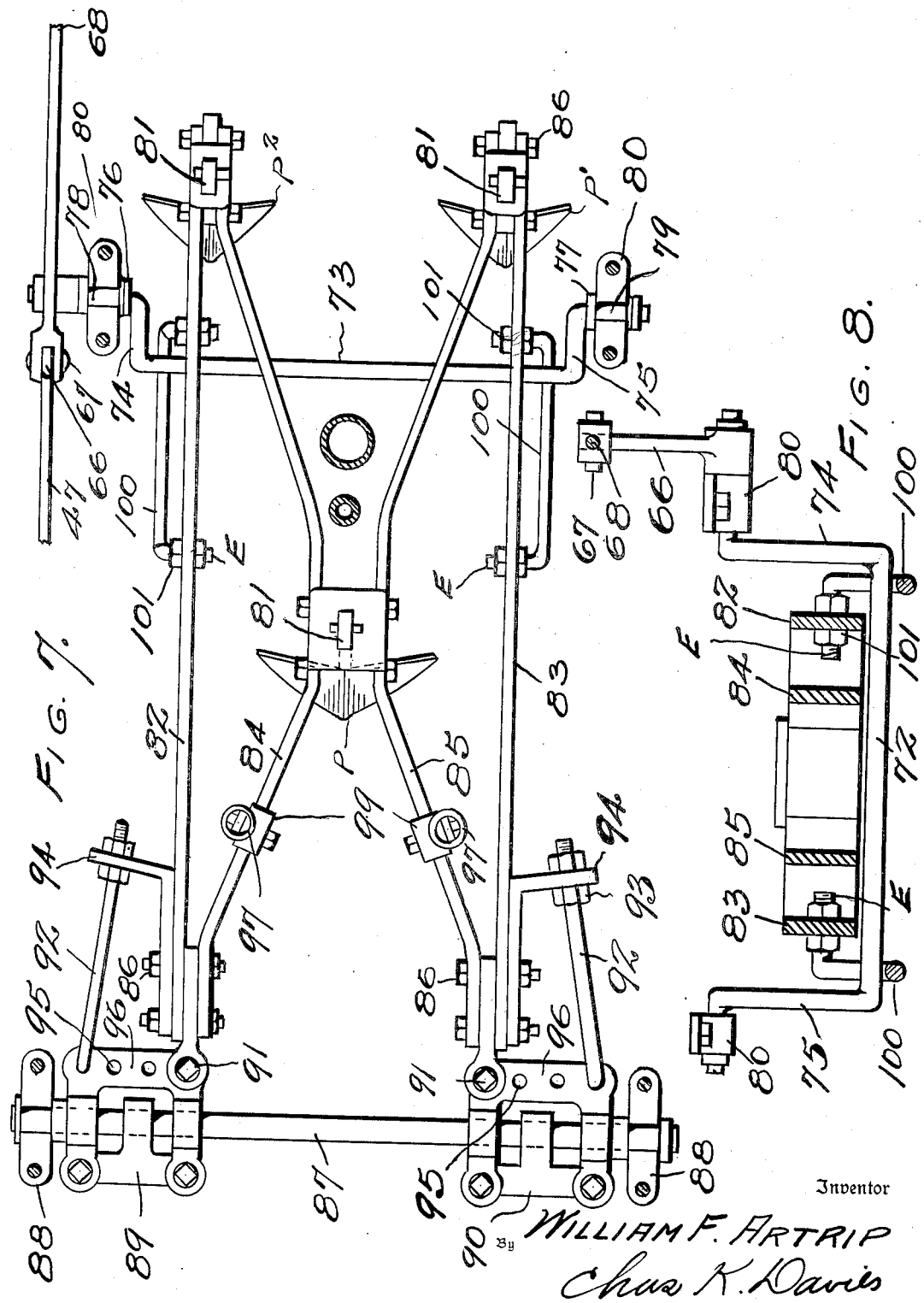

Patented May 22, 1934

1,959,561

UNITED STATES PATENT OFFICE 1,959,561

POTATO PLANTER

William F. Artrip, Winchester, Va., assignor of one-half to John W. Morgan, Riverton, Va.

Application February 14, 1933, Serial No. 656,717

5 Claims. (Cl. 111—61)

My present invention relates to improvements in potato planters of the traction operated type employing an endless chain elevator having its working flight passing upwardly through a feed hopper, for conveying the potatoes to the feed chute, and the required plows for opening and closing the furrows. While I shall hereinafter refer to the implement as a potato planter, it will be understood that other planting operations may be accomplished by means of the implement where a plow is utilized to open the furrow, the fertilizing material and the seed are deposited in the furrow, and then the furrow is closed by the following plow or plows.

The primary object of my invention is the provision of an agricultural implement of this type, which is reliable and efficient in planting the seed potatoes at the required, spaced intervals in the furrow or hill, and to this end the several parts of the implement are compactly arranged, and the operation of the parts is placed under control of a single hand lever that is located in position to be readily accessible to the driver of the vehicle.

In carrying out my invention I utilize a potato hopper and means for feeding potatoes therefrom, a fertilizer distributer and means for agitating the fertilizer, a vertically adjustable, pivoted plow frame, and a single operating lever with transmission mechanism between the lever and the plow frame for operating the pivoted plow frame. I also utilize control clutches for the potato-feed mechanism and for the agitating device of the fertilizer, together with transmission mechanism, under control of the single hand lever.

By the manipulation of the single control lever, the operation of the endless-chain conveyer of the planter, and the fertilizer distributer are controlled, and the location of the plows is simultaneously adjusted or governed.

Thus, when required, as for instance when making a turn at the end of a row, the lever is employed to throw out the gear and thereby render inoperative the feed chain-conveyer for the potatoes, and at the same time and by the same movement of the lever, the plows are elevated to inoperative position. Means are also combined with the plow frame whereby the plows may not only be elevated from the soil when desired or necessary, but the plows are retained in their proper positions beneath the surface of the soil, and prevented from accidentally rising from the soil.

My invention consists in certain novel devices, combinations, and arrangements of parts, whereby simplicity in construction, and simplicity and convenience in operation of the implement are assured, as will hereinafter be more fully set forth and claimed. In the accompanying drawings I have illustrated one complete example of the physical embodiment of my invention wherein the parts are combined and arranged according to the best mode I have thus far devised for the practical application of the principles of my invention, but it will be understood that changes and alterations are contemplated, and may be made, within the scope of my appended claims without departing from the principles of my invention.

Figure 1 is a vertical sectional view, with parts in elevation, of the potato planter embodying my invention, and showing the plows in position for use.

Figure 2 is a detail side view, as seen from the far side of Figure 1, with shafts in section, showing the driving mechanism of the planter and the fertilizer distributer, the single control lever therefor, and the plow frame controlled by the lever.

Figure 3 is a detail view showing the connection of the clutch link to the shaft of the potato feeding mechanism, and the control lever. Figure 4 is a detail view of the adjustable link between the lever and the plow lifting mechanism.

Figure 5 is a detail view partly in section of one of the clutch devices, in closed position; and Figure 6 shows the clutch in open or disengaged position.

Figure 7 is a top plan view showing the pivoted plow frame and plows, and lifting means therefor.

Figure 8 is a detail sectional view, transversely of the plow frame, showing the crank shaft for elevating and lowering the plow frame.

Figure 9 is a horizontal, sectional detail view of part of the fertilizer distributer, and its driving means.

In Figure 1, which shows a preferred form of my invention embodied in a potato planter I have illustrated the implement as adapted to be drawn by a team of horses, and provided with traction wheels 1, journaled on the axle 2, which extends transversely of the main frame 3, and the axle as shown, is located near the rear end of the implement, for the support of the latter.

A draft tongue 4 is indicated in Figure 1 at the front of the implement, and the usual seat 5, for the accommodation of the driver, is located at the rear end of the implement. A swivel wheel 6, preferably with a concave periphery, is journaled at the front and longitudinal center line of the planter for the support of the front portion of the planter, and also for packing the soil in front of the front, centrally located furrow-opening plow P, in order that the latter may properly cut the furrow in which the potatoes are to be planted.

The seed potatoes, in quantity as desired, are carried in the V-shaped hopper 7, which is preferably fashioned with a lining 8 of metal or other suitable material, and the hopper, which is supported at the rear end of the implement, between the two traction wheels, in the frame 3, has four walls that converge from the open top to the narrow bottom, as indicated in Figure 1, in order that the seed potatoes may readily be lifted and elevated to the upper part of the hopper.

A fertilizer hopper 9 is also mounted in the frame 3 at the longitudinal center line of the implement, in front of the feed hopper 7, and the fertilizer is provided with an outlet chute 10 having its discharge opening just back of the plow P and alined with, and in front of, the potato chute 11 and its flexible extension 11a.

At a suitable distance to the rear of the feed chute for the potatoes, are located a pair of laterally spaced, covering plows P' and P2, and it will be understood that the fertilizing material is deposited in the furrow opened by the plow P, after which the seed potato is dropped into the furrow, and the two laterally spaced covering plows P' and P2, as they advance with the implement, cover up the planted potato, and form the hill, in usual manner.

The seed potatoes are elevated and conveyed from the hopper 7 through the use of an endless sprocket conveyer chain 12, which passes over an upper sprocket wheel 13 and around and under the lower sprocket wheel 14, the latter being loose on the axle 2 of the implement, and located directly below the open bottom of the hopper 7. The working flight of the conveyer-chain passes up through the front portion of the hopper, and then at the exterior of the hopper, the chain passes over the sprocket wheel 13 on the shaft 15, which shaft is journaled in bearings at the top of the hopper 7. A guide sprocket 16 on shaft 17, exterior of the hopper, is provided for the conveyer chain, and the shaft has bearings in the adjustable bracket 18 mounted on the frame 3.

At regular spaced intervals, the conveyer chain or elevator is provided with cups 19 to pick up and carry the seed potatoes, the hopper being provided with a bottom opening 20 to permit entrance of the cups to the interior of the hopper. The cups carry the successive potatoes to the top of the hopper, and they are passed through a hood 21 at the top of the chute 11, dropping at regular intervals, by gravity, through the chute 11 and extension 11a to the soil.

As seen in Figure 1, the hopper 7 is provided with a bumping roller 22, located in the path of movement of the working flight of the chain conveyer, within the hopper, and as the links of the chain-conveyer bump over the roller, the cup carrying more than one seed potato, is agitated in such manner as to dislodge the excess potato or potatoes gathered by the ascending cup.

The fertilizer hopper 9 is provided with a cup portion or cylindrical bottom 23, in which a rotary agitator 24 operates to stir the fertilizer, and direct the fertilizer, in powder form to the chute 10. This rotary agitator is mounted on the upper end of an upright shaft 35 journaled in suitable bearings 36 supported by the frame 37 rigid with the main frame and located below the fertilizer cup.

Below the bottom of the fertilizer, a large, horizontal, bevel gear 37' is mounted on the shaft 35, and this gear 37' is revolved by means of a vertically disposed bevel pinion 38 on the transversely extending drive shaft 39, which is journaled in suitable bearings. The outer end of this shaft 39 projects beyond the side of the implement, as does also the outer end of the shaft 15 of the conveyer chain 12, for a purpose to be described.

On the projecting ends of these two shafts 39 and 15 are located driving clutches, and means are provided for simultaneously engaging and disengaging these driving clutches for operating the potato conveyer and the fertilizer distributer, and for rendering these devices also inoperative. The two clutches are of duplicate construction, and the description of the construction and operation of one device will suffice for both.

In the detail illustrations of the clutches one of the devices is mounted on the shaft 39 of the fertilizer distributer, and the other clutch is mounted on the shaft 15 of the potato conveyer chain.

The shaft 39 is provided with a loose, slidable sprocket wheel 40 having a clutch member 41, and a spring 42 is coiled about the shaft, at the outer side of the sprocket wheel, and interposed between this sprocket wheel and a collar 43 fixed at the end of the shaft. A complementary fixed clutch member 44 is secured on the shaft by means of a set bolt 45, and this member is fashioned with a circular or annular flange 46. A clutch link 47 is fashioned with an end loop 48, of sufficient size and shape to enclose the clutch members and slide transversely thereon, and the edge of one wall of the loop is fashioned with compound curves or cam faces 49. The loop as shown loosely encloses the clutch members, and it is interposed between the sprocket wheel 40 and the annular flange 46, so that a push on the link 47 frees the cam faces 49 from the flange 46, and permits the spring 42 to engage the clutch. A pull on the link 47, which is rigid with the loop causes the cam faces to ride across the face of the flange 46, and across the face of the sprocket wheel 40, thereby forcing the wheel to slide toward the end of the shaft 39, and against the tension of the spring 42, to open or disengage the clutch.

The drive sprocket 51 of the shaft 15 is also provided with a clutch device similar to that of the shaft 39, and the cam-loop 52 of the link 53 operates this clutch device in manner similar to the operation of the clutch of the fertilizer distributer mechanism.

In addition to the two sprocket wheels 40 and 51, I employ a main, driving sprocket wheel 54 rotatable with and mounted on the transverse shaft or axle 2 of the implement, and this main sprocket wheel is utilized as the source of power for operating the fertilizer distributer, and also the conveyer chain of the potato planter, through the driving sprocket chain 55 located at the exterior, or side of the implement, and passing around these three spaced wheels 54, 51, and 40. A belt tightener for the chain 55 is provided by the use of an idle sprocket wheel 56, engaging one flight of the chain, and having a journal bearing in the adjustable bracket 56' which bracket is supported in suitable manner on the main frame, or upon any other suitable part of the implement. The two clutch mechanisms described, the fertilizer distributer, and the conveyer chain or elevator for the potatoes, and the position of the three plows, are all controlled by means of a single hand lever 57, which is pivoted at 58 at one side of the implement where it is readily accessible for use by the driver who occupies the seat 5 of the implement. The lever is provided with the usual ratchet devices 59 and 59', and the toothed segment 60, and as best shown in Figure 3, the lever is provided with a U-bolt 61, secured by nuts 62 to the lever. The threaded ends of the U-bolt are passed through openings in the lever, and the nuts secure these threaded ends to the lever in order that the U-bolt may provide a loop for receiving and retaining the free end of the link 53 of the clutch for the potato planting device, or mechanism. The link 53 passes through this loop or holder, and the link is provided, at opposite sides of the lever, with two spaced, transversely extending stop bolts or abutments 63 and 64 which limit the relative movement of the link in its holder or loop.

By means of the initial movement of the lever 57, to the left in Figure 2, the plows P, P', and P2, are lifted from the soil, but the action of the lever on the link 53 is delayed, by use of the loose connection between the link and the lever, until near the end of the movement of the lever. Thus, the clutch of sprocket 51 is disengaged near the end of the stroke of the lever, when the holder or loop 61 contacts with the bolt or abutment 63, and continued movement of the lever at this time pulls on the link 53 to open the clutch.

When the lever is locked or latched in its rearmost position, it will be evident that the clutches are thus held out of engagement, and even though the drive chain 55 is operated by movement of the advancing implement, neither the potato feeder nor the fertilizer distributer is operated.

The clutch link 47, as best seen in Figure 2, is pivoted at 65 to a lever arm 66, and at 67 the end of this lever arm is pivotally connected at the rear end of an adjustable, sectional, connecting link, which comprises two sections 68 and 69, and the latter section has a pivotal connection at 70 to the control or operating lever 57. The overlapping ends of the sections 68 and 69 are provided with a series of bolt holes 71, and the bolts 72 are employed to fasten together these two sections, to vary the length of the connecting link.

The short lever arm 66 is rigid with a crank shaft that is fashioned with a U-shaped lifting portion 73, 74, 75, having retaining collars 76 and 77, and the journal ends 78 and 79 of this crank shaft are supported in bearings 80, attached at the underside of the main frame 3. The lever arm 66 is disposed at an angle to the U-crank, and the crank shaft is adapted to be turned in its bearings either to lift the plows or shovels P, P', P2 out of the soil, or to plunge them into the soil and thus hold them in position to cut the furrow and to close the furrow.

The plows or shovels may be of any suitable type for the purpose desired, and they are herewith shown as including upright shanks 81, together with appropriate means for mounting the shanks in the plow frame, which frame is horizontally disposed beneath the main frame of the implement, at the opposite sides of the longitudinal center line of the implement.

The plow frame comprises two outer parallel side bars 82 and 83, and two intermediate, angular brace bars 84 and 85, clamp bolts 86 being employed where necessary for rigidly joining the ends of adjacent bars and for securing the shanks of the plows in the plow frame.

At the forward or front end of the implement, the horizontally disposed and longitudinally extending plow frame is pivoted on a bar 87, which bar, at its ends is provided with supporting brackets 88 bolted at the underside of the main frame 3 of the implement. Spaced pivot yokes 89 and 90, rigid with the plow frame, are employed as hangers, to pivotally support the front end of the frame on the pivot bar. The plow frame is connected to the hangers by means of bolts as 91, and tie bolts 92, the latter being anchored by nuts 93 to the brackets 94 which are in turn fastened to the side bars of the plow frame, and these tie bolts, at their front ends are anchored in holes 95 of a plate 96 forming part of a hanger for the plow frame. As best seen in Figure 1 the front end of the plow frame inclines upwardly to its pivotal point, and the two hangers provide a wide bearing for the opposite sides of the plow frame, in order that the frame may rigidly be held in either its uplifted position, or in its lowered position, by use of the crank shaft or U-crank.

A pair of springs 97, 97, are anchored at their upper ends to brackets 98, which brackets are fixed to the main frame, or other support, and at their lower ends the springs are anchored as at 99, to the intermediate brace bars 84 and 85 of the plow frame, to assist in lifting or elevating the plow frame, as shown in Figures 1 and 2.

By reference to Figures 7 and 8 it will be seen that the U-shaped lifting yoke 73—74—75 of the crank shaft engages the under edges of the four bars 82, 83, 84, and 85 of the plow frame, to lift the frame; and also to receive the force applied thereto to plunge the plows into the soil I employ a pair of depressed bars 100, that have their angular ends E threaded and passed through holes in the side bars 82 and 83, and lock nuts 101 are employed at each side of the side bars to lock the depressed bars in place. As shown in Figure 8 the bars 100 are spaced below the lower edges of the side bars and the cross bar 73 of the yoke passes beneath the side bars and over or across the depressed bars. The depressed bars, in combination with the respective side bars, provide slots of sufficient length to permit the passage of the cross bar of the yoke (73) as it swings upwardly or downwardly on its journals 78 and 79, and it will be apparent that the yoke engages the bars 82, 83, 84, and 85 to lift the frame. It will also be apparent that the yoke engages the bars 100 to depress the plow frame and to hold the plows or shovels in position for opening and for closing the furrow.

From the above description taken in connection with my drawings, it will be evident that I have provided an implement of this character which is extremely compact in arrangement as to its arrangement of the various parts, which is simple in construction and operation, and which requires the attention of only one person during the potato-planting operations.

Thus, the driver, who occupies the seat 5 is in position to readily control the action of the two clutches and the position of the plows, simultaneously, by use of the control lever 57, and without necessity for assitsance, in the form of manual labor, from the boy or man who usually accompanies the implements now in use for planting purposes.

By a simple push on the lever 57, the clutches are caused to be engaged for operation of the fertilizer distributer, and for operation of the conveyer chain for the potatoes. Similarly, by a pull on the lever 57, the clutches are disengaged to render inoperative the potato conveyer and the fertilizer distributer, and to lift the plows from the soil.

After the plows have been lowered to operative position through the movement of the lever 57, the latter is locked or latched to hold the plows in their depressed positions, and the plows cannot be lifted from this operative position, except by operation of the control lever.

While I have shown one complete embodiment of my invention, it will be understood that changes and alterations may be made in this exemplifying structure to adapt the implement for various different purposes. For instance, the dimensions of the operating parts may be varied by changing the sizes of the sprocket wheels to vary the ratio of the driving mechanism.

As best seen in Figure 7, the plows, or plow frames, may be laterally adjusted, by the use of bolts 92, nuts 93 and 94, and the plates or links 95 having holes 96 in them for the hooked ends of the bolts, and the plows may be adjusted to desired positions longitudinally of the implement, as well as vertically, with relation to the depth to which they are to penetrate the soil in the formation of a furrow.

Changes and alterations are contemplated, and may be made, in other parts of the implement, within the scope of my appended claims, without departing from the principles of my invention.

Having thus fully described my invention, what I claim as new and desire to secure by Letters Patent is:—

1. In an implement as described the combination with a pair of driven shafts and clutch devices thereon, an adjustable plow frame and lifting means therefor, of a single operating lever, a link between said lever and one of said clutch devices for operating the latter, a connecting link between the lever and said lifting means, and a clutch link between the lifting means and the second clutch device.

2. In a potato planter, the combination with a potato hopper and means for feeding potatoes therefrom, a fertilizer distributer and means for agitating the fertilizer material, and a vertically adjustable pivoted plow frame, of a single operating lever and transmission means between said lever and plow frame for operating the latter, control clutch devices for the means for feeding the potatoes and for the means for agitating the fertilizer material, and transmission means between said control lever and the fertilizer agitator, and between said first mentioned transmission means and the potato feeding means.

3. The combination in an implement as described with potato feeding mechanism and a drive shaft therefor and a fertilizer agitator and a drive shaft therefor, of a clutch device on each of said shafts and a sprocket wheel forming a part of each clutch device, a third sprocket wheel and operating means therefor, a driving sprocket, chains on the three sprocket wheels, a single operating lever, and connections between said operating lever for controlling the respective clutch devices.

4. In a potato planter, the combination with planting mechanism and its operating shaft, fertilizer distributing mechanism and its operating shaft, power transmission means operatively connecting said shafts, a control device mounted on each shaft, and a pivotally adjustable plow frame, of a single control lever, operating connections between said lever and the control devices, and power transmission means between one of said connections and the plow frame.

5. In a potato planter, the combination with planting mechanism and its operating shaft, fertilizer distributing mechanism and its operating shaft, power transmission means operatively connecting said shafts, a driving clutch on each said shaft, and a pivotally adjustable plow frame, of a single control lever, a clutch-operating link between the lever and the clutch of the first shaft, a pair of links and a crank arm operatively connecting the lever and the clutch of the second shaft, and means co-acting with said crank arm for lifting the plow frame.

WILLIAM F. ARTRIP.